United States Patent
Xu et al.

(10) Patent No.: US 12,248,143 B2
(45) Date of Patent: Mar. 11, 2025

(54) COMPACT EYEPRINT IMAGING DEVICE

(71) Applicant: Beihang University, Beijing (CN)

(72) Inventors: Dong Xu, Beijing (CN); Weihua Song, Beijing (CN)

( * ) Notice: Subject to any disclaimer, the term of this patent is extended or adjusted under 35 U.S.C. 154(b) by 677 days.

(21) Appl. No.: 17/459,418

(22) Filed: Aug. 27, 2021

(65) Prior Publication Data
US 2022/0291504 A1      Sep. 15, 2022

(30) Foreign Application Priority Data

Mar. 10, 2021   (CN) .......................... 202110261336.3

(51) Int. Cl.
| | | |
|---|---|---|
| G02B 27/00 | (2006.01) |
| G02B 3/00 | (2006.01) |
| G02B 5/00 | (2006.01) |
| G02B 17/08 | (2006.01) |
| G02B 27/30 | (2006.01) |
| H04N 23/54 | (2023.01) |
| H04N 23/55 | (2023.01) |

(52) U.S. Cl.
CPC ....... *G02B 27/0093* (2013.01); *G02B 3/0006* (2013.01); *G02B 5/003* (2013.01); *G02B 17/08* (2013.01); *G02B 27/0075* (2013.01); *G02B 27/30* (2013.01); *H04N 23/54* (2023.01); *H04N 23/55* (2023.01)

(58) Field of Classification Search
CPC .. G02B 27/0093; G02B 3/0006; G02B 5/003; G02B 17/08; G02B 27/0075; G02B 27/30; G02B 17/023; G02B 2207/117; G02B 3/0056; G02B 27/0018; G02B 27/0081; G02B 27/00; G02B 3/00; G02B 5/00; H04N 23/54; H04N 23/55; H04N 5/225; A61B 3/14; A61B 5/163; A61B 2017/00216; G05B 2219/35503; G06F 3/013; G06F 3/015
See application file for complete search history.

(56) References Cited

U.S. PATENT DOCUMENTS

| | | | | |
|---|---|---|---|---|
| 5,182,443 A | * | 1/1993 | Suda ....................... | G03B 13/02 250/221 |
| 5,532,784 A | * | 7/1996 | Nishimura ............. | G03B 13/02 396/51 |
| 8,824,779 B1 | * | 9/2014 | Smyth ....................... | G06T 7/73 382/117 |
| 10,656,707 B1 | * | 5/2020 | Sharma ................... | G06F 3/013 |

(Continued)

*Primary Examiner* — Balram T Parbadia

(57) ABSTRACT

A compact eyeprint imaging device is provided. The device includes a plano-convex lens, a right angle triangular prism, a micro lens array, an imaging detector and an external package. The plano-convex lens and the micro lens array are glued on an inclined face of the right angle triangular prism and two right angle faces of the right angle triangular prism are coated with reflecting films, so as to form an integrated combined optical unit, which is inserted into the external package together with the imaging detector. The device is wholly installed on a glasses frame. Light emitted by the eyeprint passes through the plano-convex lens to form parallel light beams, which are reflected twice through the two right angle faces of the right angle triangular prism and then focused through the micro lens array, so as to form a multi-aperture eyeprint image array on the imaging detector.

4 Claims, 6 Drawing Sheets

(56) References Cited

U.S. PATENT DOCUMENTS

| | | | |
|---|---|---|---|
| 2011/0164166 A1* | 7/2011 | Oikawa | G02B 7/36 |
| | | | 348/340 |
| 2014/0268044 A1* | 9/2014 | Copland | A61B 3/107 |
| | | | 351/246 |
| 2017/0289524 A1* | 10/2017 | Pacala | G02B 5/208 |
| 2018/0167602 A1* | 6/2018 | Pacala | G02B 5/208 |
| 2018/0329065 A1* | 11/2018 | Pacala | H04B 10/503 |
| 2019/0286228 A1* | 9/2019 | Sangu | G06F 3/011 |
| 2019/0307326 A1* | 10/2019 | Copland | A61B 3/102 |
| 2019/0377198 A1* | 12/2019 | Lemoff | H04N 23/55 |
| 2020/0069177 A1* | 3/2020 | Kim | A61B 3/1015 |
| 2021/0212601 A1* | 7/2021 | Neal | A61B 5/1128 |
| 2021/0360154 A1* | 11/2021 | Slobodin | H04N 23/90 |

* cited by examiner

COMPACT EYEPRINT IMAGING DEVICE

CROSS-REFERENCE TO RELATED APPLICATION

This application claims the benefit and priority of Chinese Patent Application No. 202110261336.3 entitled "A Compact Eyeprint (Scleral Blood Vessel) Imaging Device" filed with the Chinese Patent Office on Mar. 10, 2021, which is incorporated herein by reference in its entirety.

TECHNICAL FIELD

The present disclosure relates to the field of optical imaging system design, in particular to an eyeprint (scleral blood vessel) near-distance imaging device, which has advantages of large depth of field and high spatial resolution.

BACKGROUND ART

Vision is a main way for people to obtain external information, and due to the fact that sight is direct, natural, bidirectional and the like, and can reflect the visual behavior of human, so that the sight tracking technology has wide application prospects in the fields of human-computer interaction, visual behavior analysis, information retrieval and the like. At present, the leading sight tracking technology is that eye movement measuring equipment is used for recording movements of eyeballs, and then the sight direction of the movements of eyeballs is calculated, so as to track the sight of the human eyes. Among them, most of the methods are as follows: firstly, an eye image is acquired through an image acquisition device, and then the sight direction and coordinates of a fixation point are calculated according to pupil or light spot position information in the eye image.

Existing eye image acquisition devices are mainly configured for detecting pupils or reflected light spots, which needs to be carried out under infrared illumination, so that imaging results will be changed along with the changing of external illumination, and are not stable. In addition, pupils are also affected by factors such as physical state and emotion, so that is difficult to obtain high spatial resolution. Compared with pupils and reflected light spots, eyeprints (scleral blood vessels) are very stable biological recognition features and have better stability. Therefore, many scholars and institutions have researched methods and devices for eyeprint imaging. For example, T. Priyadharshini acquires a scleral blood vessel image in a visible light mode and believes that the blood vessel is well distinguishable from the sclera and can be used as a biological recognition feature. Subsidiary ZOLOZ of Ant Financial Service Group announces successful research and development of an eyeprint recognition technology in 2017, which is divided into two parts: image acquisition and image comparison, and the image acquisition is the basis of image comparison.

In applications such as sight tracking, a device for eye imaging is usually installed near the eyes, so that the object distance is small, and the depth of the field of traditional optical imaging systems is small. Because the surfaces of eyeballs are curved, and the distance from the surface of the sclera to the entrance pupil of an imaging system is very variable, and traditional short-distance optical imaging systems are difficult to meet requirements of the eyeprint imaging. Therefore, it is necessary to develop a device for eyeprint imaging with small size, large depth of field and high spatial resolution.

SUMMARY

The embodiments aim to provide a compact eyeprint (scleral blood vessel) imaging device, which solves the problems that existing optical imaging devices have small depth of field and cannot clearly image large-range eyeprints at a short distance.

In order to achieve the purpose of the present disclosure, the compact eyeprint (scleral blood vessel) imaging device includes a plano-convex lens, a right-angle triangular prism, a micro-lens array, a light filter, an imaging detector and an external package. the plano-convex lens and the micro lens array are glued on an inclined face of the right angle triangular prism, and two right angle faces of the right angle triangular prism are coated with reflecting films to form an integrated combined optical unit (as shown in FIG. 4), which is inserted into the external package together with the imaging detector (as shown in FIG. 9). The external package may comprise an optical unit slot, an imaging detector slot, a light through hole and a non-transparent light absorption sidewall, as shown in FIG. 7. After an assembly is completed (as shown in FIG. 8 and FIG. 9), the light through hole may be closely attached to the plano-convex lens to form an aperture diaphragm and the imaging detector may be inserted into the imaging detector slot, so that a detection surface of the imaging detector may be located on a back focal plane of the micro lens array. The light filter is placed in front of the plano-convex lens or in a light path between the micro lens array and the imaging detector, and can pass through strong absorption spectrum bands of sclera blood vessels, and filters interference of other spectrum bands.

The device may be wholly installed on a glasses frame (or similar object). Light emitted by the eyeprint may pass through the plano-convex lens to form parallel light beams, which may be reflected twice through the two right angle faces of the right angle triangular prism and then focused through the micro lens array, so as to form a clear multi-aperture eyeprint image array on the imaging detector, as shown in FIG. 1. By selecting the size of the light through hole, each sub-image of the multi-aperture eyeprint image array, which corresponds to a small area of an entire eye sclera, may be generated by corresponding one sub-lens of the micro-lens array, and may have an eyeprint resolution capability and contains a part of clear eyeprints. And a sub-image may repeat its adjacent sub-image to some extent, and adjacent sub-images do not overlap each other, as shown in FIG. 11.

DETAILED DESCRIPTION OF THE EMBODIMENTS

The present disclosure is further described below in combination with the drawings.

Figure 1:
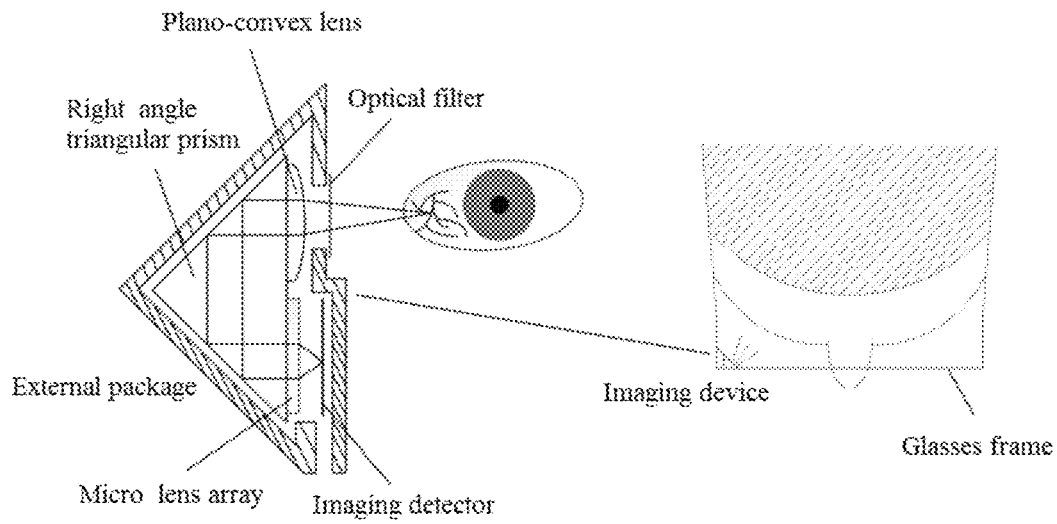
FIG. 1 is a schematic diagram of light path during eyeprint imaging in a free space.
Figure 4:
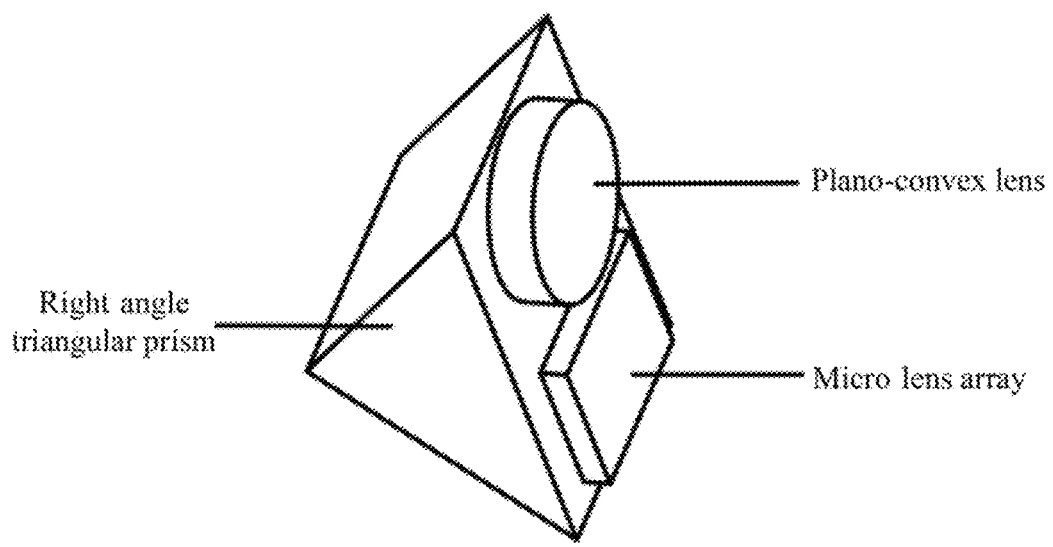
FIG. 4 is a schematic diagram of integral construction of an integrated combined optical unit.
Figure 5:
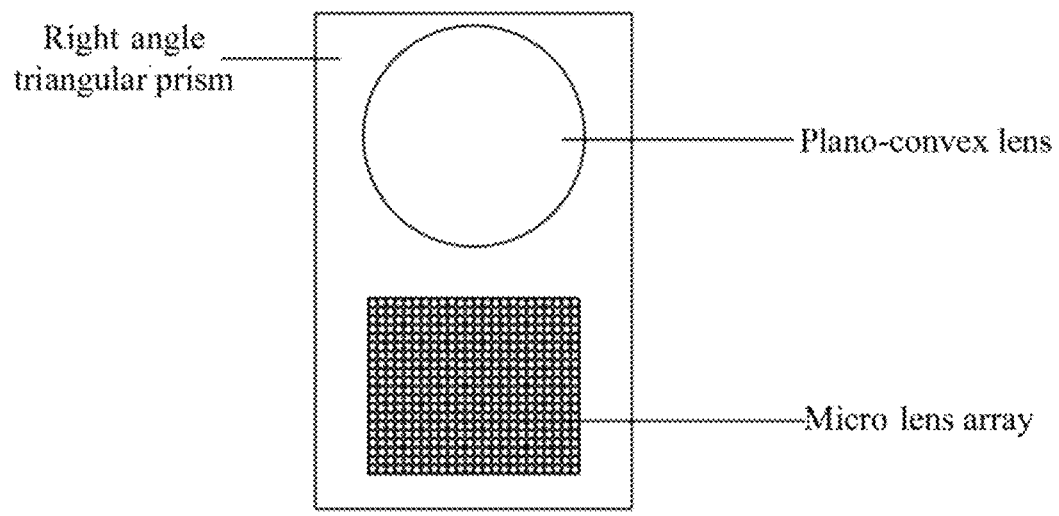
FIG. 5 is a front schematic diagram of the integrated combined optical unit.
Figure 6:
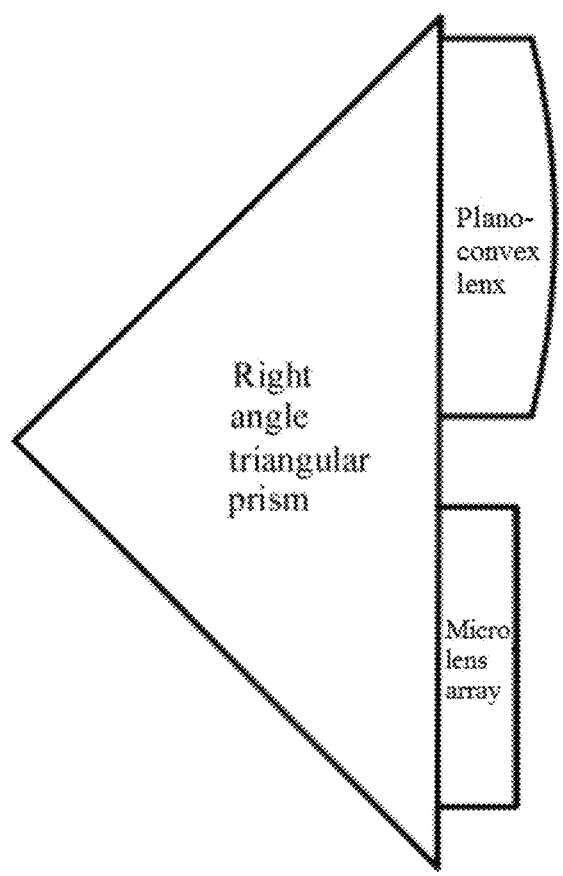
FIG. 6 is a profile schematic diagram of the integrated combined optical unit.
Figure 7:
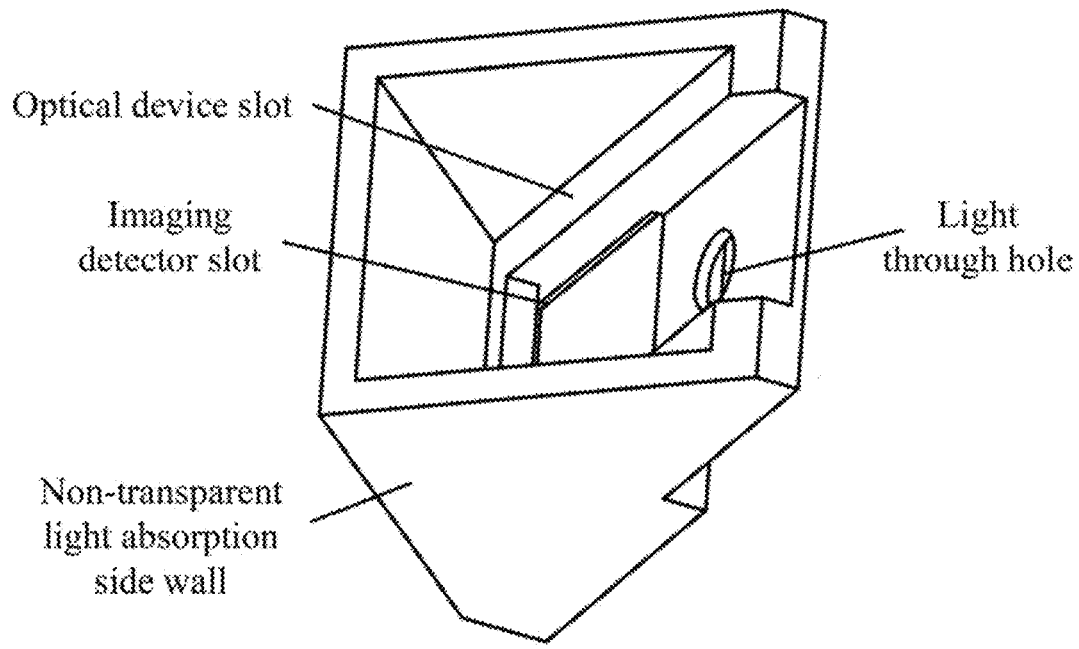
FIG. 7 is an integral structure diagram of an external package.
Figure 8:
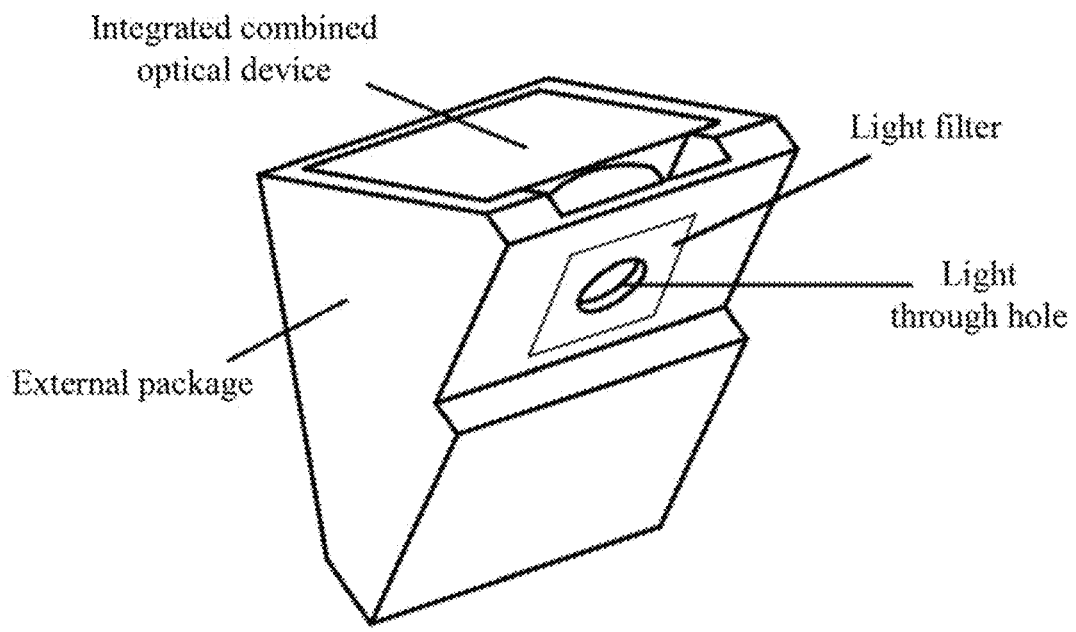
FIG. 8 is an integral structure diagram of the compact eyeprint imaging device.
Figure 9:
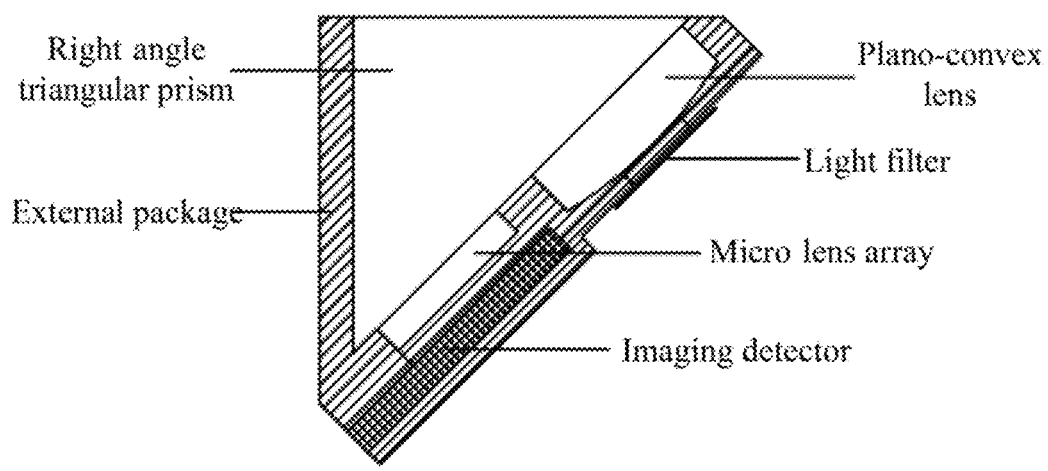
FIG. 9 is a lateral sectional diagram showing a structure of the compact eyeprint imaging device.

In one embodiment of the present disclosure, a compact eyeprint imaging device is provided. The imaging device is integrally installed on a glasses frame and located in front of a side of the eyes, and can perform clear imaging on large-range of the eyeprints at a short distance, as shown in FIG. 1. The imaging device includes a plano-convex lens, a right angle triangular prism, a micro lens array, an optical filter, an imaging detector and an external package. The plano-convex lens and the micro lens array are glued on an inclined face of the right angle triangular prism to form an integrated combined optical unit (as shown in FIG. 4, FIG. 5 and FIG. 6), and two right-angle faces of the right-angle triangular prism are coated with reflecting films. The integrated combined optical unit and the imaging detector are inserted into the external package together. The external package includes an optical unit slot, an imaging detector slot, a light through hole and a non-transparent light absorption sidewall, as shown in FIG. 7. After the assembly is completed (as shown in FIG. 8 and FIG. 9), the integrated combined optical unit is inserted into the optical device slot of the external package, the light through hole is closely attached to the plano-convex lens to form an aperture diaphragm, the light through hole is covered with the optical filter, and the imaging detector is inserted into the imaging detector slot, so that the imaging detector is located on a back focal plane of the micro lens array. The optical filter can be traversed by strong absorption spectrum bands of sclera blood vessels, and can filter out other spectrum bands to avoid the interference of the other spectrum bands, which is conducive to form clear eyeprint images.

Figure 2:
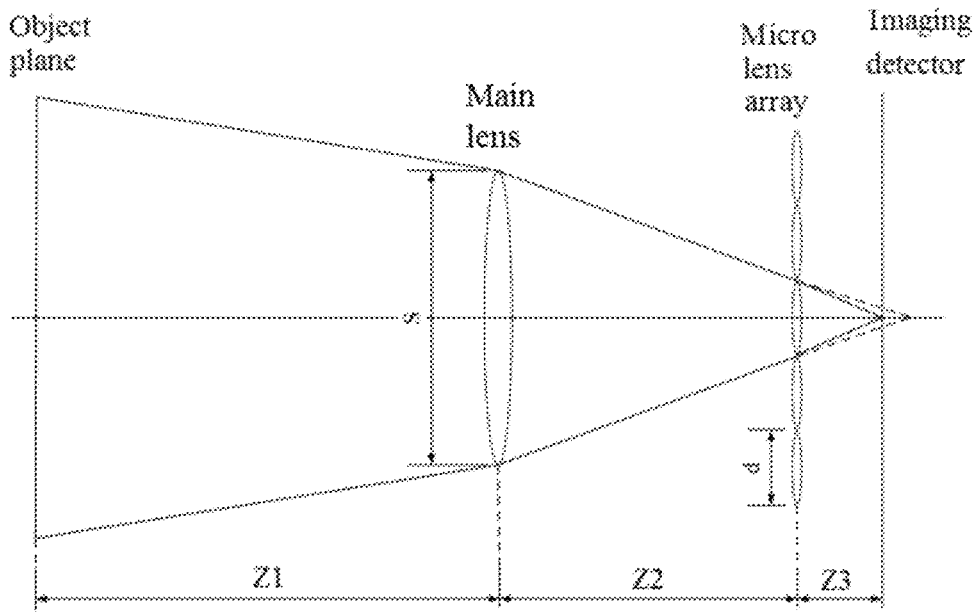
FIG. 2 is an equivalent schematic diagram of a vacuum light path of a compact eyeprint imaging device.
Figure 3:
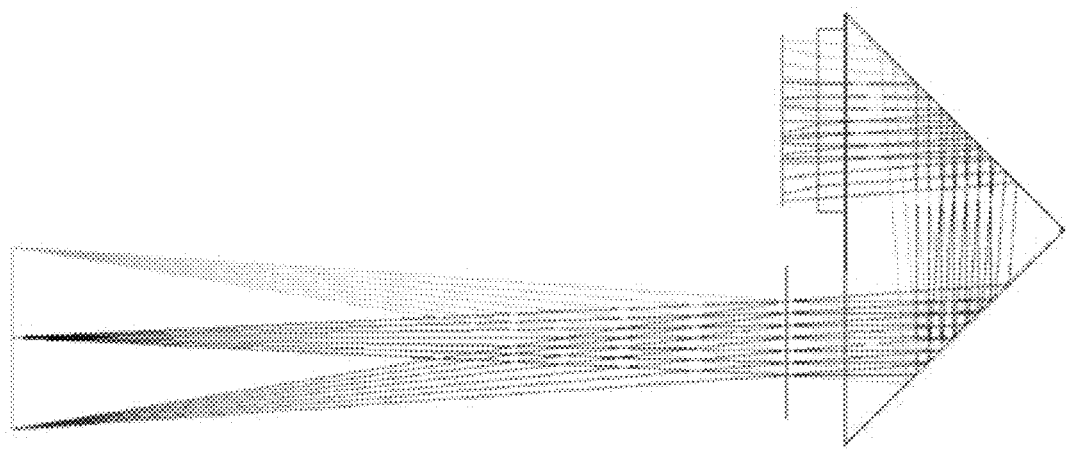
FIG. 3 is a schematic diagram of an imaging principle of the compact eyeprint imaging device.
Figure 11:
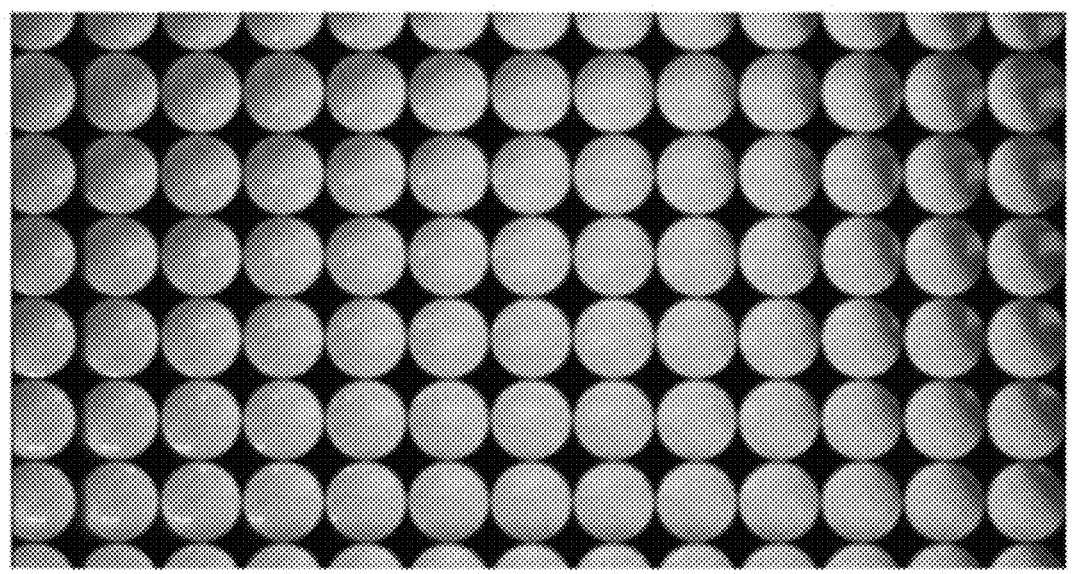
FIG. 11 is a diagram of eyeprint imaging result.

In the embodiment, an imaging principle of the system is as shown in FIG. 3, and a diagram of an equivalent light path in vacuum is as shown in FIG. 2. A distance Z1 from an optical center of the plano-convex lens to a surface of an eye is approximately 25 mm; the focal length f1 of the plano-convex lens is f1=25 mm, the length of a right angle side of the right angle triangular prism is 10 mm, and the right angle triangular prism is made of K9 glass. In the case that a distance from the lens to the micro-lens array is characterized by a length of light path Z2 in vacuum, the length of the light path Z2 is 11.165 mm. A diameter d of sub-apertures in the micro lens array is d=0.25 mm, and the focal length f2 of the micro lens array is f2=1.163 mm. The light through hole is closely attached to the main lens (that is, the plano-convex lens) to form an aperture diaphragm. In order to ensure that the images corresponding to the sub-apertures do not influence each other, a size S of the aperture diaphragm is S=2.4 mm. A distance Z3 from a detection surface of the imaging detector to a micro lens is Z3=f2=1.163 mm. A per unit pixel size of the imaging detector is 0.002 mm×0.002 mm. Light emitted by the eyeprint passes through the plano-convex lens to form parallel light beams, subsequently are reflected twice through the two right-angle faces of the right angle triangular prism, and then focused through the micro lens array, so as to form a clear multi-aperture eyeprint image array on the imaging detector. Each sub-image of the multi-aperture eyeprint image array, which corresponds to a small area of an entire eye sclera, can be generated by corresponding one sub-lens of the micro-lens array, and has an eyeprint resolution capability and contains a part of clear eyeprints. A sub-aperture image repeats its adjacent sub-aperture image to some extent, and adjacent sub-images do not overlap each other, as shown in FIG. 11.

Figure 10:
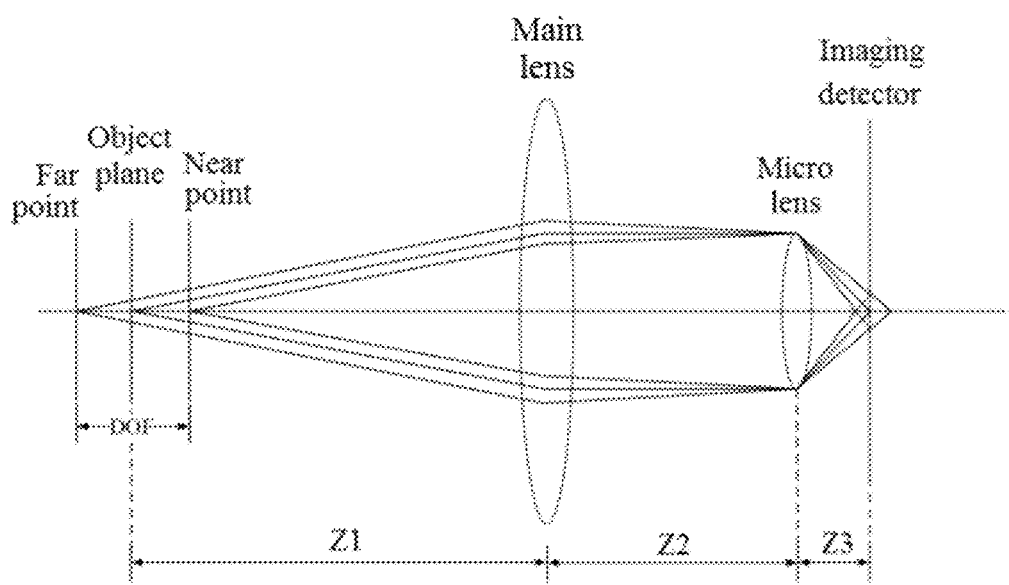
FIG. 10 is a schematic diagram of depth of field of the compact eyeprint imaging device.

In the embodiment, a field of view for each sub-aperture image is approximately 5.68°×5.68°, which is equivalent to an imaging range in an object space of approximately 4.5 mm×4.5 mm. A total effective field of view of the system is a sum of fields of view for all the sub-apertures each capable of completely forming a image, and is approximately 42.67°×36.61°, which is equivalent to an total imaging range in the object space of approximately 28.88 mm×23.29 mm. Considering that a size of the eyeprint area at an outer side of the eye is approximately 10 mm×10 mm, the device can completely meet the requirement for the eyeprint imaging. A side length of each detection unit in the imaging detector is 0.002 mm, and a side length of a corresponding object element is approximately 0.043 mm, namely, per unit pixel can perform imaging on content with a width of 0.043 mm in the object space. A width of the actual eyeprint is about 0.3 mm to 0.5 mm, which is equivalent to 7 to 11 pixels in the imaging detector, thus the device can realize accurate imaging of the eyeprint. According to an imaging relationship (as shown in FIG. 10), the depth of field (DOF) of the imaging system can be calculated to be 8.67 mm, which can completely meet the requirement of clear eyeprint imaging.

Although the embodiments of the present disclosure have been described with reference to the attached figures, it is apparent that the above-described embodiments are not all embodiments of the present disclosure, and are used only to illustrate the technical solution of the present disclosure, but not to limit the same. Those skilled in the art should understand that numerous variations, modifications, substitutions and variations may still be made to the above-described embodiments without departing from the principles and spirit of the present disclosure, the scope of which is defined by the appended claims and equivalents thereof

What is claimed is:

1. A compact eyeprint imaging device, wherein the device comprises a plano-convex lens, a right angle triangular prism, a micro lens array, an optical filter, an imaging detector and an external package; the plano-convex lens and the micro lens array are glued on an inclined face of the right angle triangular prism and two right angle faces of the right angle triangular prism are coated with reflecting films, so as to form an integrated combined optical unit, which is inserted into the external package together with the imaging detector; and the light optical filter is placed in front of the plano-convex lens or in a light path between the micro lens array and the imaging detector.

2. The compact eyeprint imaging device according to claim 1, wherein the device is wholly installed on a glasses frame, a front focal distance of the plano-convex lens is approximately equal to a distance between the plano-convex lens and a surface of an eyeball, light emitted by the eyeprint passes through the plano-convex lens to form parallel light beams, which are reflected twice through the two right angle faces of the right angle triangular prism and then focused through the micro lens array, so as to form a clear multi-aperture eyeprint image array on the imaging detector.

3. The compact eyeprint imaging device according to claim 1, wherein the external package comprises an optical unit slot, an imaging detector slot, a light through hole and a non-transparent light absorption sidewall, after an assembly is completed, the light through hole is closely attached to the plano-convex lens to form an aperture diaphragm and the imaging detector is inserted into the imaging detector slot so that a detection surface of the imaging detector is located on a back focal plane of the micro lens array.

4. The compact eyeprint imaging device according to claim 3, wherein by selecting an size of the light through hole, each sub-image of the multi-aperture eyeprint image array, which corresponds to a small area of an entire eye sclera, is generated by corresponding one sub-lens of the micro-lens array, and has an eyeprint resolution capability and contains a part of clear eyeprints; and a sub-image repeat its adjacent sub-image to some extent, and adjacent sub-images do not overlap each other.

* * * * *